(12) United States Patent
Nishibu et al.

(10) Patent No.: US 7,886,525 B2
(45) Date of Patent: Feb. 15, 2011

(54) EXHAUST GAS PURIFICATION DEVICE OF INTERNAL COMBUSTION ENGINE

(75) Inventors: Hideaki Nishibu, Tokai (JP); Tsuneaki Aoki, Kariya (JP)

(73) Assignee: Aisan Kogyo Kabushiki Kaisha, Obu-shi, Aichen-ken (JP)

( * ) Notice: Subject to any disclaimer, the term of this patent is extended or adjusted under 35 U.S.C. 154(b) by 599 days.

(21) Appl. No.: 11/952,350

(22) Filed: Dec. 7, 2007

(65) Prior Publication Data

US 2008/0148716 A1    Jun. 26, 2008

(30) Foreign Application Priority Data

Dec. 20, 2006    (JP) ............................. 2006-342492

(51) Int. Cl.
*F01N 3/00*    (2006.01)
(52) U.S. Cl. .............................. 60/286; 60/289; 60/292; 60/295; 60/303; 137/565.13; 137/625.42
(58) Field of Classification Search .................. 60/286, 60/289, 292, 293, 295, 297, 301, 303; 137/487.5, 137/565.13, 625.42
See application file for complete search history.

(56) References Cited

U.S. PATENT DOCUMENTS

| | | | | |
|---|---|---|---|---|
| 5,884,475 | A * | 3/1999 | Hofmann et al. | 60/274 |
| 6,293,097 | B1 * | 9/2001 | Wu et al. | 60/286 |
| 6,470,673 | B1 * | 10/2002 | van Nieuwstadt et al. | 60/274 |
| 6,912,846 | B2 * | 7/2005 | Huber et al. | 60/286 |
| 7,100,366 | B2 * | 9/2006 | Hager et al. | 60/286 |
| 7,458,204 | B2 * | 12/2008 | Plougmann | 60/286 |

FOREIGN PATENT DOCUMENTS

JP    9511807    11/1997
JP    2006132384    5/2006

* cited by examiner

*Primary Examiner*—Binh Q. Tran
(74) *Attorney, Agent, or Firm*—Dennison, Schultz & MacDonald

(57) ABSTRACT

An exhaust gas purification device of an internal combustion engine is taught that preferably include a storage tank storing an exhaust gas purification solution that is injected into an exhaust passage of the internal combustion engine, a solution supply line that is constructed to introduce the exhaust gas purification solution from the storage tank to the exhaust passage, a supply pump disposed on the solution supply line, and a gas-liquid selection device. The gas-liquid selection device is constructed to selectively introduce the exhaust gas purification solution and air into the solution supply line.

11 Claims, 6 Drawing Sheets

EXHAUST GAS PURIFICATION DEVICE OF INTERNAL COMBUSTION ENGINE

This application claims priority to Japanese patent application serial number 2006-342492, the contents of which are incorporated herein by reference.

BACKGROUND OF THE INVENTION

The present invention relates to an exhaust gas purification device of an internal combustion engine that is used in a vehicle such as an automobile. Particularly, the present invention relates to an exhaust gas purification device of an internal combustion engine, which may purify nitrogen oxides ($NO_x$) contained in an exhaust gas of the internal combustion engine using an exhaust gas purification solution.

An exhaust gas purification device of an internal combustion engine, e.g., a diesel engine or a gasoline engine, is taught by, for example, Japanese Laid-Open Patent Publication No. 9-511807. In this device, an aqueous solution of urea contained in a storage tank is injected into an exhaust gas of the internal combustion engine via a solution supply line, so that the exhaust gas is purified.

In the exhaust gas purification device thus constructed, the aqueous solution of urea must be prevented from freezing in the solution supply line in order to prevent damage of the solution supply line. For this purpose, this device is designed such that a pressure gas is pumped from a pressure gas container into the solution supply line using a pressure pump when the internal combustion engine is stopped, so that the aqueous solution of urea in the solution supply line may preferably be returned into the storage tank by the pressure gas. However, this structure requires the pressure gas container, the pressure pump or other such devices. This may lead to increased size of the exhaust gas purification device.

Thus, there is a need in the art for an improved exhaust gas purification device of an internal combustion engine.

BRIEF SUMMARY OF THE INVENTION

For example, in one embodiment of the present invention, an exhaust gas purification device of an internal combustion engine may include a storage tank storing an exhaust gas purification solution that is injected into an exhaust passage of the internal combustion engine, a solution supply line that is constructed to introduce the exhaust gas purification solution from the storage tank to the exhaust passage, a supply pump disposed on the solution supply line, and a gas-liquid selection device. The gas-liquid selection device is constructed to selectively introduce the exhaust gas purification solution and air into the solution supply line. The exhaust gas purification solution is injected from the solution supply line into the exhaust passage, thereby purifying an exhaust gas in the exhaust passage.

According to the exhaust gas purification device, when the internal combustion engine is operated, the exhaust gas purification solution in the storage tank is selected by the gas-liquid selection device. As a result, the solution is aspirated into the solution supply line by the supply pump and is then injected into the exhaust passage, so that the exhaust gas can be purified. Conversely, when the internal combustion engine is stopped, the air in the storage tank is selected by the gas-liquid selection device. As a result, the air is aspirated by the supply pump and is then pumped through the solution supply line, so that the exhaust gas purification solution in the solution supply line can be discharged therefrom. Thus, the solution supply line can be vacuated. Therefore, damage of the solution supply line caused by freezing of the exhaust gas purification solution in the solution supply line can be effectively pre rented or reduced.

Further, the exhaust gas purification device does not require a pressure gas container, a pressure pump or other such devices. This may lead to reduced size of the exhaust gas purification device.

In another embodiment of the present invention, an exhaust gas purification device of an internal combustion engine may include a storage tank storing an exhaust gas purification solution that is injected into an exhaust passage of the internal combustion engine, a solution supply line that is constructed to introduce the exhaust gas purification solution from the storage tank to the exhaust passage, a supply pump disposed on the solution supply line, and a flow path switching device disposed on the solution supply line. The flow path switching device is capable of selectively switching between a normal flow mode in which the exhaust gas purification solution in the storage tank is normally flown through the solution supply line toward the exhaust passage and a reverse flow mode in which the exhaust gas purification solution in the solution supply line is reversely flown through the solution supply line toward the storage tank. The exhaust gas purification solution is injected from the solution supply line into the exhaust passage, thereby purifying an exhaust gas in the exhaust passage.

According to the exhaust gas purification device, when the internal combustion engine is operated, the flow path switching device is switched to the normal flow mode. As a result, the exhaust gas purification solution in the storage tank is aspirated into the solution supply line by the supply pump and is then injected into the exhaust passage, so that the exhaust gas can be purified. Conversely, when the internal combustion engine is stopped, the flow path switching device is switched to the reverse flow mode. As a result, the exhaust gas purification solution remaining in the solution supply line can be returned to the storage tank. Thus, the solution supply line can be vacuated. Therefore, damage of the solution supply line caused by freezing of the exhaust gas purification solution remaining in the solution supply line can be effectively prevented or reduced.

Further, as described above, when the internal combustion engine is stopped, the exhaust gas purification solution remaining in the solution supply line can be reliably returned to the storage tank. Therefore, the exhaust pipe can be prevented from corroding. Further, an unfavorable odor is prevented from being emitted via the exhaust pipe. In addition, waste of the exhaust gas purification solution can be reduced or prevented.

Other objects, features, and advantages, of the present invention will be readily understood after reading the following detailed description together with the accompanying drawings and the claims.

DETAILED DESCRIPTION OF THE INVENTION

Next, the representative embodiments of the present invention will be described with reference to the drawings.

First Embodiment

A first embodiment of the present invention will be described with reference to FIGS. 1 to 7. This embodiment of the present invention is directed to an exhaust gas purification device in which an aqueous solution of urea is used as an exhaust gas purification solution, i.e., a liquid reducing agent, so that nitrogen oxides ($NO_x$) contained in an exhaust gas of an internal combustion engine is purified via a catalytic reductive reaction.

Figure 1:
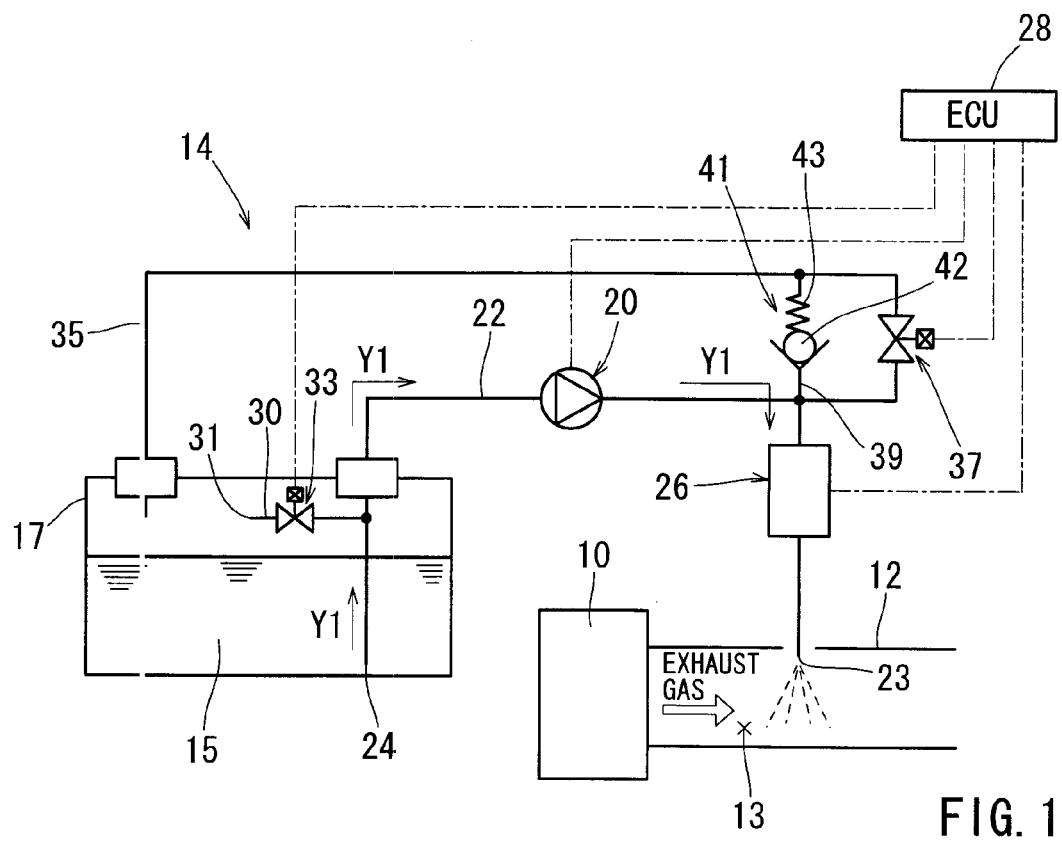
FIG. 1 is a schematic diagram of an exhaust gas purification device of an internal combustion engine according to a first embodiment of the present invention.

As shown in FIG. 1, an exhaust gas discharged from an internal combustion engine 10, e.g., a diesel engine or other such engines, may preferably be discharged into the atmosphere through an exhaust gas purification catalyst or $NO_x$ reduction catalyst (not shown) that is received in an exhaust pipe 12, i.e., in an exhaust passage 13.

An exhaust gas purification device 14 attached to the internal combustion engine 10 has a storage tank 17 that can store an exhaust gas purification solution 15. The exhaust gas purification solution 15 is aspirated or introduced into a solution supply line 22 by a supply pump 20 and is pumped through the solution supply line 22. The pumped solution 15 is then injected into the exhaust passage 13 via a solution injection orifice 23 that is positioned at a downstream end of the solution supply line 22. (In particular, the solution injection orifice 23 may preferably be positioned such that the solution 15 can be injected into a portion of the exhaust passage 13 positioned above the exhaust gas purification catalyst.) The exhaust gas purification solution 15 injected via the solution injection orifice 23 of the solution supply line 22 is hydrolyzed with the aid of exhaust heat and water vapors contained in the exhaust gas, so as to be transformed into ammonia. The ammonia thus produced reacts with the $NO_x$ contained in exhaust gas with the aid of the exhaust gas purification catalyst, so as to be purified, thereby producing water and harmless gases.

A solution aspiration orifice 24 is formed in an upstream end of the solution supply line 22. The solution aspiration orifice 24 is opened in the vicinity of a bottom portion of the storage tank 17. That is, the solution aspiration orifice 24 is immersed in the solution 15 reserved in the storage tank 17. Also, the solution supply line 22 is provided with an electromagnetic flow rate control valve 26 that is capable of controlling an injection amount of the exhaust gas purification solution 15. The flow rate control valve 26 may preferably be positioned between the supply pump 20 and the solution injection orifice 23. Further, the supply pump 10 and the flow rate control valve 26 are respectively electrically connected to an electronic control unit (ECU) 28, so as to controllably supply the exhaust gas purification solution 15 to the exhaust passage 13. The supply pump 20 and the flow rate control valve 26 may preferably be controlled by the ECU 28 such that when the internal combustion engine 10 is operated, an appropriate amount of the solution 15 can be supplied to the exhaust passage 13 based on an operational condition of the internal combustion engine 10. As will be appreciated, the supply pump 20 may preferably be a pump that is capable of pumping both of a liquid and a gas (air).

One end of an air aspiration line 30 is connected to the solution supply line 22 inside the storage tank 17. The other end of the air aspiration line 30 is formed with an air aspiration orifice 31. The air aspiration orifice 31 is opened above a liquid level of the solution 15. The air aspiration line 30 is provided with a first electromagnetic on-off valve (a gas-liquid selection device) 33 that is capable of opening and closing the line 30. The first on-off valve 23 is electrically connected to the ECU 28, so as to be controllably opened and closed. The first on-off valve 33 is closed by the ECU 28 when the internal combustion engine 10 is operated. Conversely, the first on-off valve 33 is opened by the ECU 28 when the internal combustion engine 10 is stopped. Therefore, the exhaust gas purification solution 15 or air in the storage tank 17 can be selectively introduced into the solution supply line 22 by opening and closing the first on-off valve 33.

One end of a return line 35 is connected to the solution supply line 22 at a position between the supply pump 20 and the flow rate control valve 26. The other end of the return line 35 is introduced into the storage tank 17 and is opened above the liquid level of the solution 15. The return line 35 is provided with a second electromagnetic on-off valve 37 that is capable of opening and closing the line 35. The second on-off valve 37 is electrically connected to the ECU 28, so as to be controllably opened and closed. The second on-off valve 37 is closed by the ECU 28 when the internal combustion engine 10 is operated. Conversely, the second on-off valve 37 is opened when the internal combustion engine 10 is stopped.

A bypass line 39 is disposed between the return line 35 and the solution supply line 22, so as to be positioned in parallel with the second on-off valve 37 (i.e., so as to bypass the second on-off valve 37). Naturally, the bypass line 39 can be disposed in the return line 35 provided that the bypass line 39 is positioned in parallel with the second on-off valve 37.

The bypass line 39 is provided with a relief valve 41. The relief valve 41 includes a valve member 42 capable of opening and closing the bypass line 39. The relief valve 41 further includes a spring 43. The spring 43 is arranged so as to normally elastically press the valve member 42 in a closing direction. Therefore, the bypass line 39 is normally closed. When a pressure in a portion of the solution supply line 22 positioned between the supply pump 20 and the flow rate control valve 26 (including a portion of the return line 35 positioned above the second on-off valve 37) exceeds a predetermined value, the valve member 42 is opened against a spring force of the spring 43, so that the relief valve 41 is opened. As a result, the exhaust gas purification solution 15 in the portion of the solution supply line 22 is purged via the bypass line 39, so that the pressure in the portion can be reduced to a predetermined value. When the pressure in the portion reaches the predetermined value, the valve member 42 is closed by the spring force of the spring 43.

In the exhaust gas purification device 14 of the internal combustion engine 10, when the internal combustion engine 10 is operated, the first on-off valve 33 and the second on-off valve 37 are respectively closed by the ECU 28 (FIG. 1). In this condition, when the supply pump 20 is actuated by the ECU 28 and at the same time, the flow rate control valve 26 is controlled by the ECU 28, the exhaust gas purification solution 15 in the storage tank 17 is aspirated into the solution supply line 22 and is pumped therethrough, as shown by arrows Y1 in FIG. 1. The pumped solution 15 is then injected into the exhaust passage 13 via the solution injection orifice 23. Thus, the exhaust gas is purified.

Figure 2:
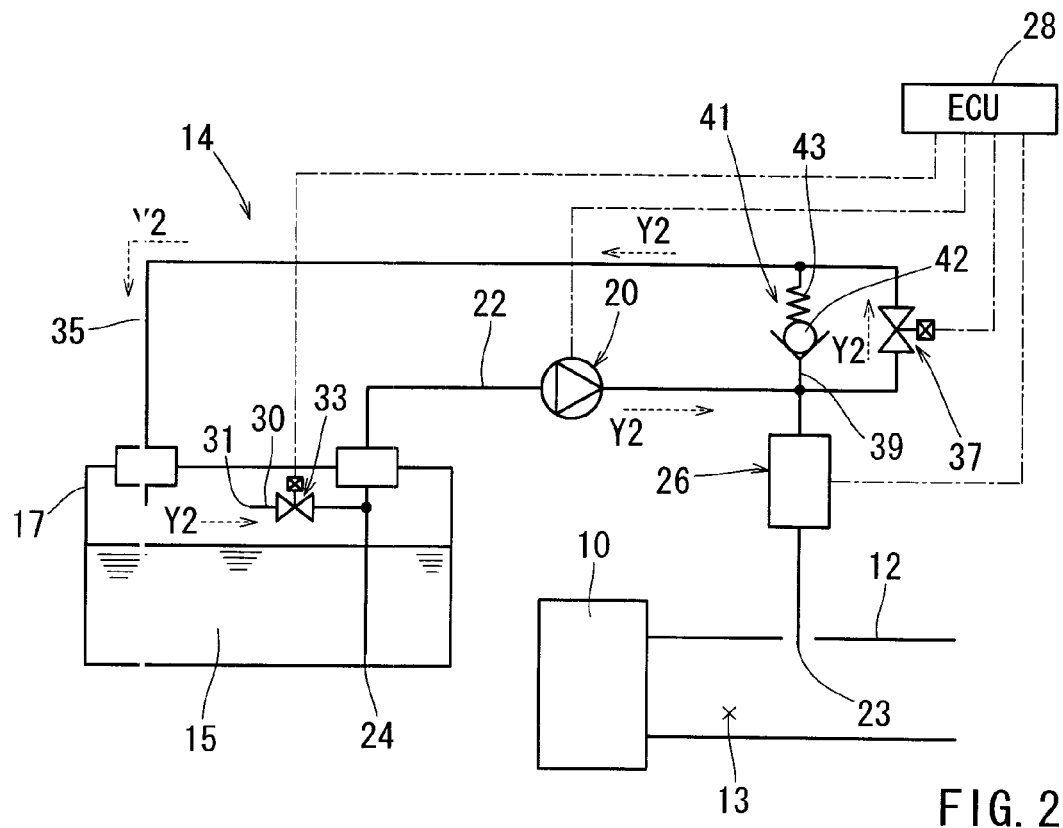
FIG. 2 is a schematic diagram of the exhaust gas purification device, which corresponds to a condition in which the internal combustion engine is stopped.

When the internal combustion engine 10 is stopped, the first on-off valve 33 and the second on-off valve 37 are opened by the ECU 28 and at the same time, the flow rate control valve 26 is closed by the ECU 28 (FIG. 2). In this condition, the supply pump 20 is actuated by the ECU 28. As a result, the air in the storage tank 17 is introduced into the solution supply line 22 via the air aspiration line 30, so that the exhaust gas purification solution 15 remaining in the solution supply line 22 is returned from the solution supply line 22 to the storage tank 17 via the return line 35 by the supply pump 20, as shown by arrows Y2 in FIG. 2. Therefore, the exhaust gas purification solution 15 remaining in the solution supply line 22 (except for the exhaust gas purification solution 15 remaining in a portion of the solution supply line 22 positioned between the flow rate control valve 26 and the solution injection orifice 23) is returned into the storage tank 17. Further, when a predetermined time elapses after the internal combustion engine 10 is stopped, the supply pump 20 is stopped by the ECU 28 on the assumption that the exhaust gas purification solution 15 remaining in the solution supply line 22 is completely discharged therefrom. Further, the solution supply line 22 can be additionally provided with a liquid sensor (not shown) that is capable of detecting the exhaust gas purification solution 15. In this case, the liquid sensor is electrically connected to the ECU 28, so that the supply pump 20 can be stopped by the ECU 28 based on a detection signal from the liquid sensor.

According to the exhaust gas purification device 14 thus constructed, when the internal combustion engine 10 is operated, the exhaust gas purification solution 15 in the storage tank 7 is selected by the first on-off valve 33. As a result, the solution 15 is aspirated into the solution supply line 22 by the supply pump 20 and is then injected into the exhaust passage 13, so that the exhaust gas can be purified (FIG. 1). Conversely, when the internal combustion engine 10 is stopped, the air in the storage tank 17 is selected by the first on-off valve 33. As a result, the air is aspirated by the supply pump 20 and is then pumped through the solution supply line 22, so that the exhaust gas purification solution 15 in the solution supply line 22 can be returned into the storage tank 17 via the return line 35 (FIG. 2). Thus, the solution supply line 22 can be vacuated. Therefore, damage of the solution supply line 22 caused by freezing of the exhaust gas purification solution 15 in the solution supply line 22 can be effectively prevented or reduced. In addition, this structure does not require a pressure gas container, a pressure pump or other such devices that are required in the known structure. This may lead to reduced size of the exhaust gas purification device. That is, according to the exhaust gas purification device 14, it is possible to prevent or reduce the freezing damage caused by freezing of the solution 15 while downsizing the device 14. Therefore, the exhaust gas purification device 14 can be advantageously used in internal combustion engines of compact vehicles, compact ships or other such machines in which a mounting space of the device 14 is limited.

Further, in the exhaust gas purification device 14, when the internal combustion engine 10 is stopped, the air in the storage tank 17 is used in order to purge the exhaust gas purification solution 15 in the solution supply line 22. That is, ambient air is not used in order to purge the exhaust gas purification solution 15 in the solution supply line 22. Thus, the exhaust gas purification device 14 is formed as a closed circulatory system. Therefore, an unfavorable; odor is prevented from being emitted from the exhaust gas purification device 14.

Further, in the exhaust gas purification device 14, it is possible to use a one-way pump as the supply pump 20. That is, it is not necessary to use a complicated reversible pump as the supply pump 20. This may lead to a reduced manufacturing cost of the exhaust gas purification device 14.

Further, in the exhaust gas purification device 14, when the internal combustion engine 10 is stopped, the exhaust gas purification solution 15 in the solution supply line 22 can be reliably returned into the storage tank 17 via the return line 35 (FIG. 2). That is, when the internal combustion engine 10 is stopped, the exhaust gas purification solution 15 is not discharged into the exhaust passage 13. Therefore, the exhaust pipe 12 can be prevented from corroding. Further, an unfavorable odor is prevented from being emitted via the exhaust pipe 12. In addition, waste of the exhaust gas purification solution 15 can be reduced or prevented.

Further, when the second on-off valve 37 disposed on the return line 35 is opened, the exhaust gas purification solution 15 remaining in the solution supply line 22 can be rapidly returned into the storage tank 17 via the return line 35 (FIG. 2).

Further, when the pressure in a portion of the solution supply line 22 positioned below the supply pump 20 exceeds the predetermined value, the pressure can be purged into the return line 35 by the relief valve 41. Thus, the pressure in the portion of the solution supply line 22 positioned below the supply pump 20 can be stabilized.

Further, as previously described, the return line 35 is provided with the second on-off valve 37. The second on-off valve 37 is closed when the internal combustion engine 10 is operated. Conversely, the second on-off valve 37 is opened when the internal combustion engine 10 is slopped. Therefore, when the second on-off valve 37 disposed on the return line 35 is opened in a condition that the internal combustion engine 10 is stopped, the exhaust gas purification solution 15 in the solution supply line 22 can be easily returned into the storage tank 17 via the return line 35.

The exhaust gas purification device 14 of the internal combustion engine 10 according to the first embodiment (FIGS. 1 and 2) of the present invention can be suitably modified. Some modified forms of the first embodiment will now described with reference to FIGS. 3 to 7.

Because the modified forms relate to the first embodiment, only the constructions and elements that are different from the first embodiment will be explained in detail. Elements that are the same in the first and second embodiments will be identified by the same reference numerals and a detailed description of such elements may be omitted.

Further, in each of FIGS. 3 to 7, a flow of the exhaust gas purification solution 15, when the internal combustion engine 10 is operated, is shown by arrows Y1. Conversely, a flow of the exhaust gas purification solution 15 and the air, when the internal combustion engine 10 is stopped, is shown by arrows Y2.

First Modified Form of First Embodiment

Figure 3:
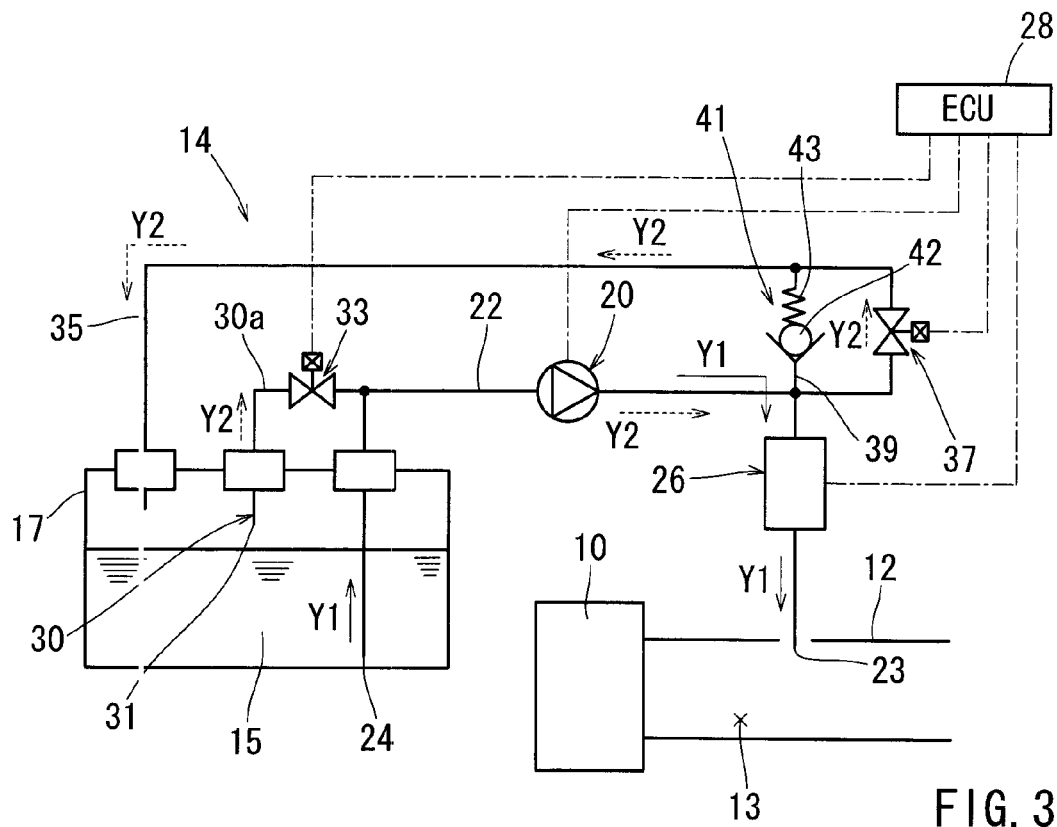
FIG. 3 is a schematic diagram of a first modified form of the first embodiment.

As shown in FIG. 3, in a first modified form of the first embodiment, one end of the air aspiration line 30 is connected to the solution supply line 22 via an extension line 30a outside the storage tank 17. Further, the first on-off valve 33 is disposed on the extension line 30a. According to this modified form, the first on-off valve 33 is positioned outside the storage tank 17. This may lead to easy attachment and maintenance of the first on-off valve 33. In addition, the on-off valve 33 and associated parts (electric wires) can be effectively prevented or inhibited from corroding.

Second Modified Form of First Embodiment

Figure 4:
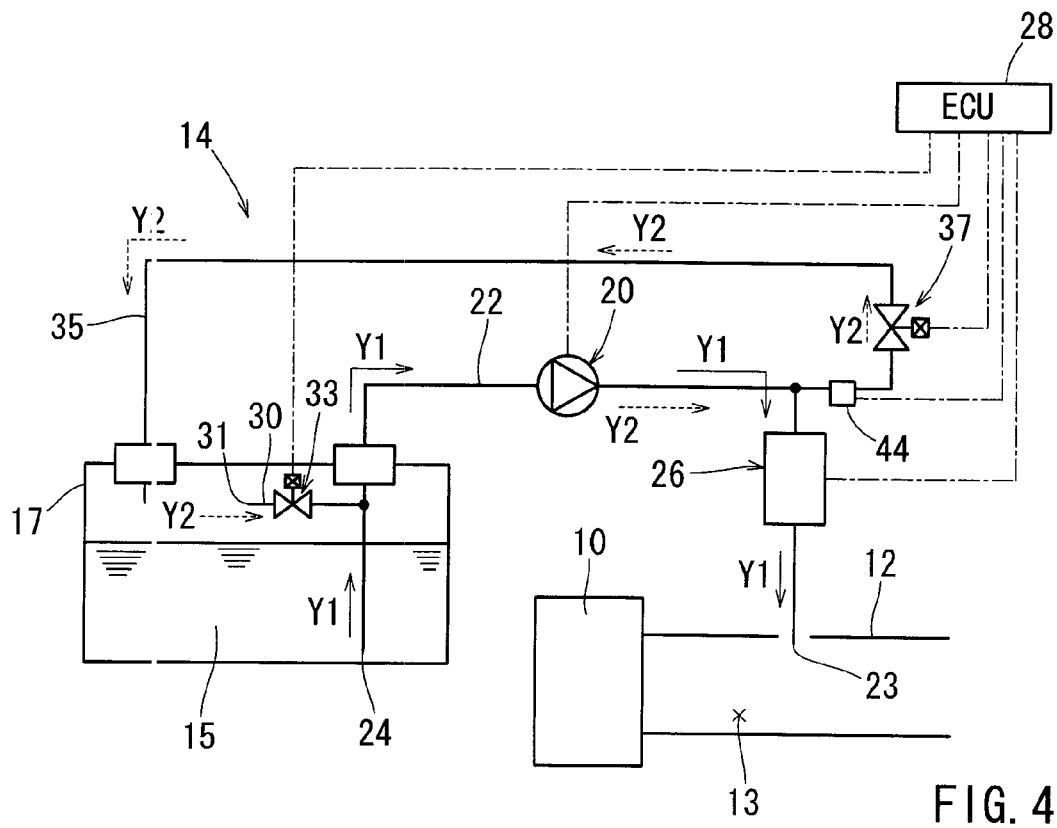
FIG. 4 is a schematic diagram of a second modified form of the first embodiment.

As shown in FIG. 4, in a second modified form of the first embodiment, the bypass line 39 and the relief valve 41 are omitted. Instead, the return line 35 is provided with a pressure sensor 44 that is capable of detecting a pressure therein. The pressure sensor 44 is positioned above the second on-off valve 37 and is electrically connected to the ECU 28. The ECU 28 can control a discharge pressure of the supply pump 20 based on a signal output from the pressure sensor 44. Alternatively, the ECU 28 can control the second on-off valve 37 based on the signal output from the pressure sensor 44, so as to stabilize a pressure applied to the flow rate control valve 26. As will be appreciated, the pressure sensor 44 is not limited to a special sensor provided that the pressure sensor 44 can detect the pressure in the portion of the solution supply line 22 positioned between the supply pump 20 and the flow rate control valve 26 (including the portion of the return line 35 positioned above the second on-off valve 37).

Third Modified Form of First Embodiment

Figure 5:
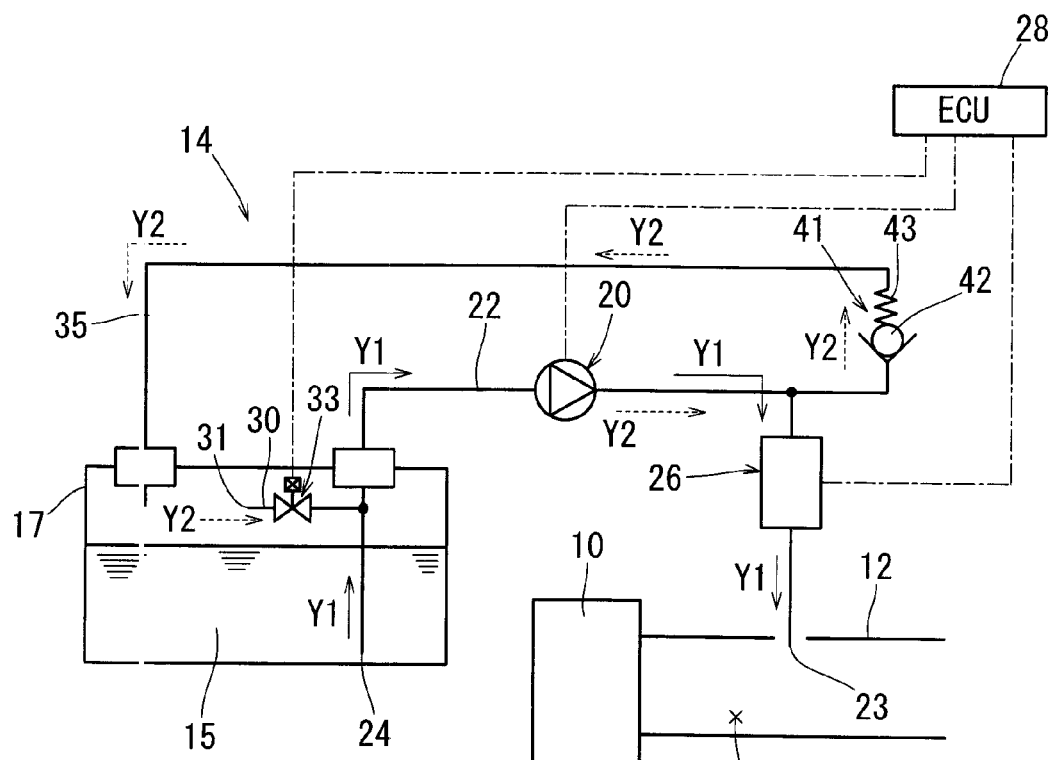
FIG. 5 is a schematic diagram of a third modified form of the first embodiment.

As shown in FIG. 5, in a third modified form of the first embodiment, the bypass line 39 including the relief valve 41 is omitted. In addition, the second on-off valve 37 is replaced with the relief valve 41. In this modified form, when the internal combustion engine 10 is stopped, the supply pump 20 is operated while the flow rate control valve 26 is closed. Therefore, when the pressure in the solution supply line 22 exceeds a predetermined value of the relief valve 41, the exhaust gas purification solution 15 remaining in the solution supply line 22 is returned into the storage tank 17 via the return line 35.

Fourth Modified Form of First Embodiment

Figure 6:
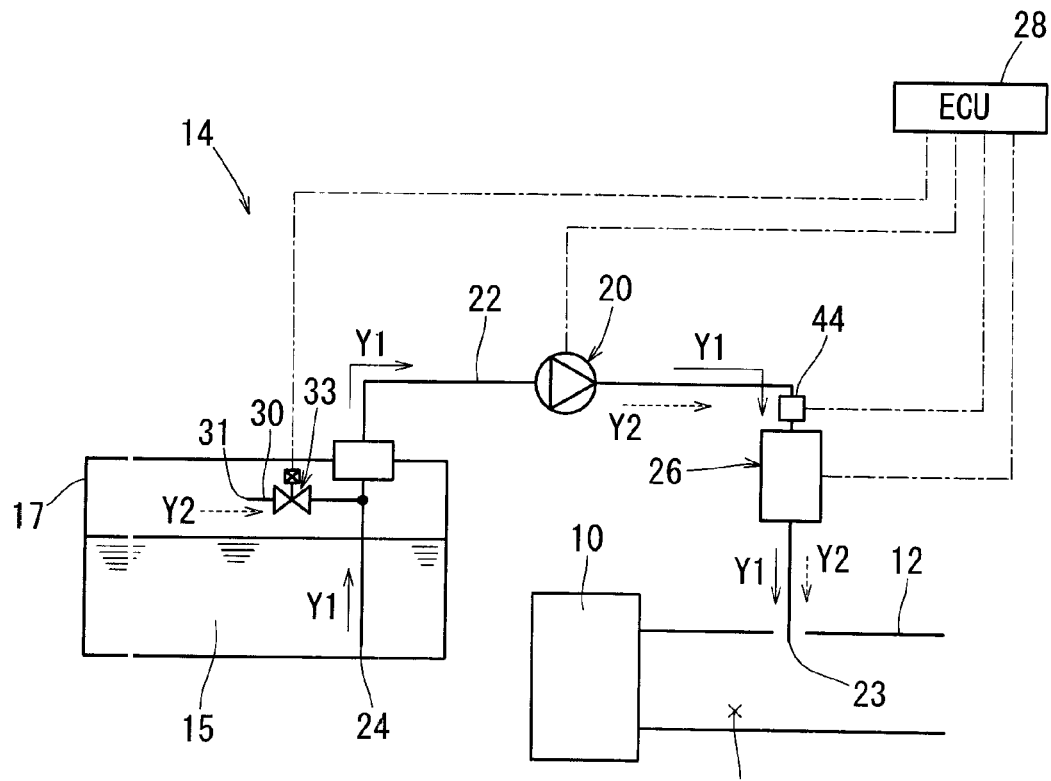
FIG. 6 is a schematic diagram of a fourth modified form of the first embodiment.

As shown in FIG. 6, in a fourth modified form of the first embodiment, the return line 35, the second on-off valve 37 and the bypass line 39 including the relief valve 41 are omitted. Instead of the relief valve 41, the supply line 20 is provided with a pressure sensor 44 that is capable of detecting a pressure therein. The pressure sensor 44 is positioned between the supply pump 20 and the flow rate control valve 26 and is electrically connected to the ECU 28. The ECU 28 can control a discharge pressure of the supply pump 20 based on a signal output from the pressure sensor 44, so as to stabilize a pressure applied to the flow rate control valve 26.

In this modified form, when the internal combustion engine 10 is stopped, the ECU 28 opens the flow rate control valve 26, so that the exhaust gas purification solution 15 remaining in the solution supply line 22 is discharged into the exhaust passage 13.

Fifth Modified Form of First Embodiment

Figure 7:
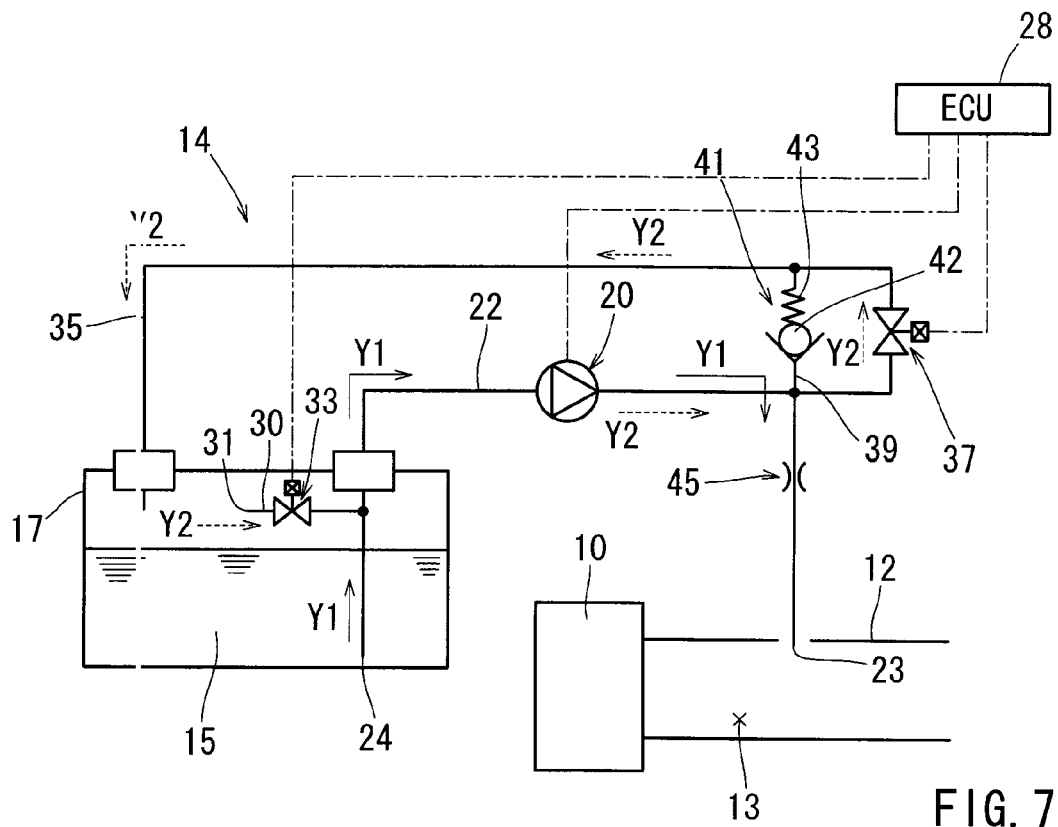
FIG. 7 is a schematic diagram of a fifth modified form of the first embodiment.

As shown in FIG. 7, in a fifth modified form of the first embodiment, the flow rate control valve 26 is replaced with a squeezed portion 45 that is formed in the solution supply line 22. As will be recognized, the squeezed portion 45 does not have a variable flow control function or an opening and closing function, so that a predetermined amount of the solution 15 can be simply supplied or injected into the exhaust passage 13 via a solution injection orifice 23. In this modified form, when the internal combustion engine 10 is stopped, a portion of the exhaust gas purification solution 15 remaining in the solution supply line 22 is discharged into the exhaust passage 13 via the squeezed portion 45 because the squeezed portion 45 cannot be closed. However, a remaining portion of the exhaust gas purification solution 15 can be returned into the storage tank 17 via the return line 35. Further, the squeezed portion 45 can be replaced with a nozzle (not shown) that is attached to the solution injection orifice 23 of the solution supply line 22, so that the predetermined amount of the solution 15 can be injected into the exhaust passage 13 via the nozzle.

Naturally, various changes and modifications may be made to the first embodiment and the modified forms. For example, an injection nozzle (not shown) can be attached to the solution injection orifice 23 of the solution supply line 22 such that the exhaust gas purification solution 15 can be reliably injected. Further, the flow rate control valve 26 can be replaced with a valve device, e.g., a gate valve and a stop valve, that does not have a variable flow control function. Also, the first on-off valve 33 and/or the second on-off valve 37 can be replaced with a valve device, e.g., a gate valve and a stop valve. In addition, the first on-off valve 33 as the gas-liquid selection device can be replaced with a flow path switching valve (not shown).

Second Embodiment

The second detailed representative embodiment will now described with reference to FIGS. 8 to 12.

Because the second embodiment relates to the first embodiment, only the construe ions and elements that are different from the first embodiment will be explained in detail. Elements that are the same in the first and second embodiments will be identified by the same reference numerals and a detailed description of such elements may be omitted.

Figure 8:
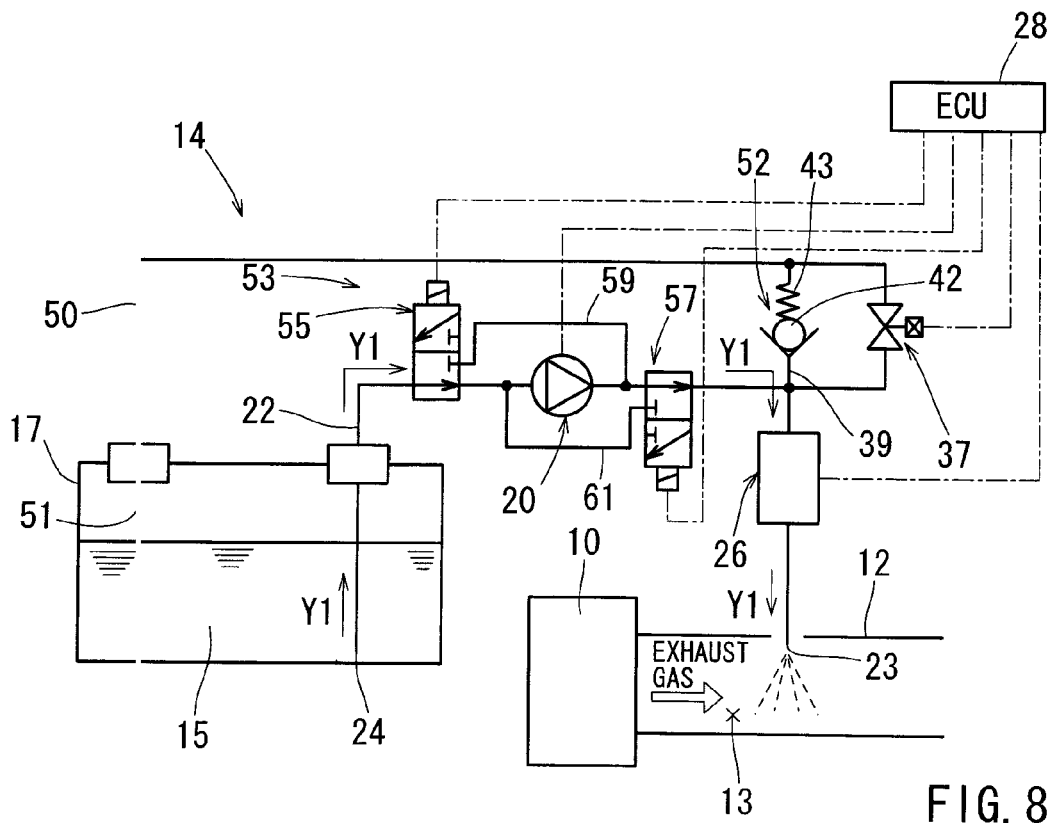
FIG. 8 is a schematic diagram of an exhaust gas purification device of an internal combustion engine according to a second embodiment of the present invention.

In this embodiment, as shown in FIG. 8, the air aspiration line 30 including the first on-off valve 33 is omitted. Further, the return line 35 is replaced with an air introduction line 50. Similar to the return line 35, one (upstream) end of the air introduction line 50 is connected to the solution supply line 22 at a position between the supply pump 20 and the flow rate control valve 26. The other (downstream) end of the air introduction line 50 is introduced into the storage tank 17 and is opened above the liquid level of the solution 15. Unlike the return line 35, the other end of the air introduction line 50 is formed with an air introduction orifice 51. Further, the relief valve 41 is replaced with a relief valve 52. When a pressure in a portion of the solution supply line 22 positioned below the supply pump 20 exceeds a predetermined value, the relief valve 52 is opened, so that the pressure can be purged into the air introduction line 50 by the relief valve 52. Further, in this embodiment, the second on-off valve 37 will be simply referred to as "the on-off valve 37" because the first on-off valve 33 is omitted.

The solution supply line 22 is provided with a flow path switching device 53 that is capable of selectively switching between a normal flow mode in which the exhaust gas purification solution 15 in the storage tank 17 can be normally flown through the solution supply line 22 toward the exhaust passage 13 and a reverse flow mode in which the exhaust gas purification solution 15 in the solution supply line 22 can be reversely flown through the solution supply line 22 toward the storage tank 17. The flow path switching device 53 includes a first flow path switching valve 55 and a second flow path switching valve 57. The first flow path switching valve 55 is disposed on a portion of the solution supply line 22 positioned above the supply pump 20. The first flow path switching valve 55 is connected to the solution supply line 22 via a first branch line 59 that is branched from the portion of the solution supply line 22 positioned below the supply pump 20. Conversely, the second flow path switching valve 57 is disposed on the portion of the solution supply line 22 positioned below the supply pump 20. The second flow path switching valve 57 is connected to the solution supply line 22 via a second branch line 61 that is branched from the portion of the solution supply line 22 positioned above the supply pump 20.

An example of the first flow path switching valve 55 is an electromagnetic three-way switching valve, more specifically, a three port-two position switching valve. The first flow path switching valve 55 is electrically connected to the ECU 28. The first flow path switching valve 55 can be controllably switched between a first switching position (FIG. 8) and a second switching position (FIG. 9) by the ECU 28. In the first switching position, the exhaust gas purification solution 15 in the storage tank 17 can be introduced into the supply pump 20. Conversely, in the second switching position, the exhaust gas purification solution 15 discharged from the supply pump 20 can be reversely flown toward the storage tank 17 via the first branch line 59.

An example of the second flow path switching valve 57 is an electromagnetic three-way switching valve, more specifically, a three port-two position switching valve. The second flow path switching valve 57 is electrically connected to the ECU 28. The second flow path switching valve 57 can be controllably switched between a first switching position (FIG. 8) and a second switching position (FIG. 9) by the ECU 28. In the first switching position, the exhaust gas purification solution 15 discharged from the supply pump 20 can be injected into the exhaust passage 13. Conversely, in the second switching position, the exhaust gas purification solution 15 in a portion of the solution supply line 22 positioned below the flow path switching valve 57 can be introduced into the supply pump 20 via the second branch line 61.

In the exhaust gas purification device 14 thus constructed, when the internal combustion engine 10 is operated, both of the first and second flow path switching valves 55 and 57 are respectively positioned at the first switching positions by the ECU 28 (FIG. 8). Thus, the flow path switching device 53 is switched to the normal flow mode which permits the exhaust gas purification solution 15 to be injected into the exhaust passage 13 via the solution supply line 22. In this condition, when the supply pump 20 is actuated by the ECU 28 and at the same time, the flow rate control valve 26 is controlled by the ECU 28, the exhaust gas purification solution 15 in the storage tank 17 is aspirated into the solution supply line 22 and is pumped therethrough, as shown by arrows Y1 in FIG. 8. The pumped solution 15 is then injected into the exhaust passage 13 via the solution injection orifice 23. Thus, the exhaust gas is purified.

Figure 9:
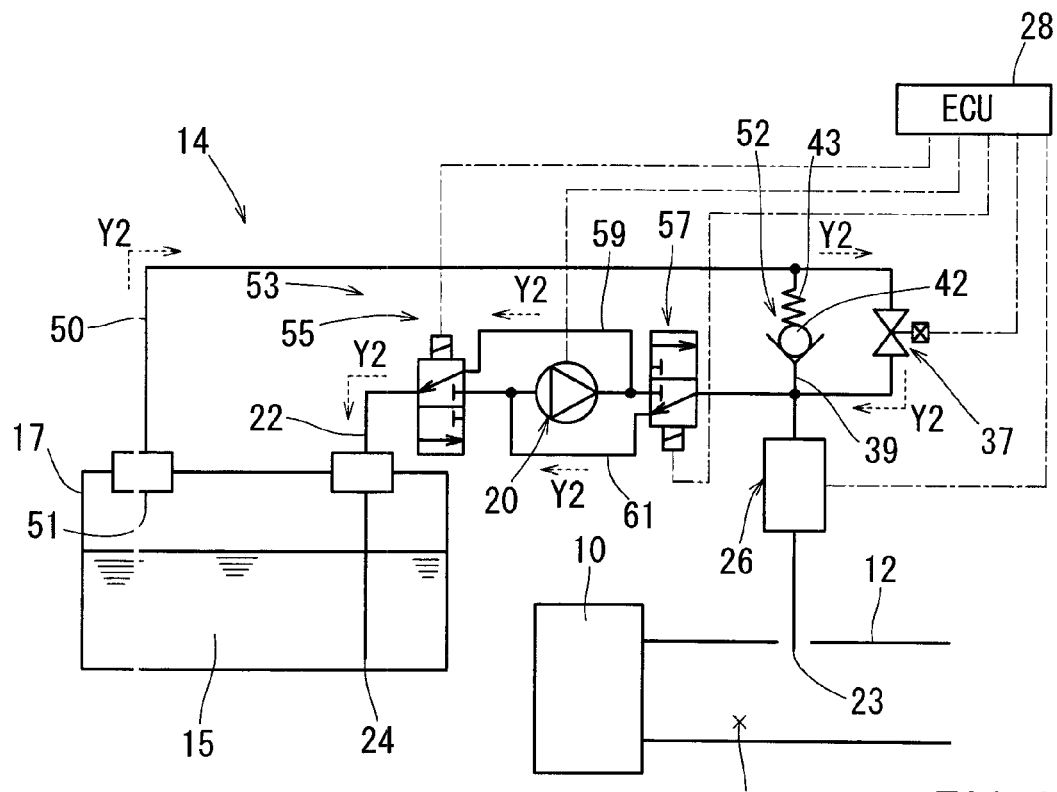
FIG. 9 is a schematic diagram of the exhaust gas purification device, which corresponds to a condition in which the internal combustion engine is stopped.

When the internal combustion engine 10 is stopped, the flow rate control valve 26 is closed by the ECU 28 and both of the first and second flow path switching valves 55 and 57 are respectively positioned at the second switching positions by the ECU 28 (FIG. 9). Thus, the flow path switching device 53 is switched to the reverse flow mode which permits the air in the storage tank 17 to be reversely flown via the air introduction line 50 and returned to the storage tank 17 via the solution supply line 22. In this condition, the supply pump 20 is actuated by the ECU 28. As a result, the air in the storage tank 17 is introduced into the portion of the solution supply line 22 positioned below the flow path switching valve 57 via the air introduction line 50, so that the exhaust gas purification solution 15 remaining in the solution supply line 22 is returned from the solution supply line 22 to the storage tank 17 via the first and second branch lines 59 and 61, as shown by arrows Y2 in FIG. 9. Further, similar to the first embodiment, when a predetermined time elapses after the internal combustion engine 10 is stopped, the supply pump 20 is stopped by the ECU 28.

According to the exhaust gas purification device 14 thus constructed, when the internal combustion engine 10 is operated, as shown in FIG. 8, the flow path switching device 53 is switched to the normal flow mode. As a result, the exhaust gas purification solution 15 in the storage tank 17 is aspirated into the solution supply line 22 by the supply pump 20 and is then injected into the exhaust passage 13 via the solution injection orifice 23, so that the exhaust gas can be purified. Conversely, when the internal combustion engine 10 is stopped, as shown in FIG. 9, the flow path switching device 53 is switched to the reverse flow mode. As a result, the air in the storage tank 17 is introduced into the portion of the solution supply line 22 position led below the flow path switching valve 57 via the air introduction line 50, the exhaust gas purification solution 15 remaining in the solution supply line 22 can be returned to the storage tank 17 via the first and second branch lines 59 and 61. Thus, the solution supply line 22 can be vacuated. Therefore, damage of the solution supply line 22 caused by freezing of the exhaust gas purification solution 15 remaining in the solution supply line 22 can be effectively prevented or reduced. In addition, similar to the first embodiment, this structure does not require a pressure gas container, a pressure pump or other such devices that are required in the known structure. This may lead to reduced size of the exhaust gas purification device. That is, according to the exhaust gas purification device 14, it is possible to prevent or reduce the freezing damage caused by freezing of the solution 15 while downsizing the device 14. Therefore, the exhaust gas purification device 14 can be advantageously used in internal combustion engines of compact vehicles, compact ships or other such machines in which a mounting space of the device 14 is limited.

Further, in the exhaust gas purification device 14, when the internal combustion engine 10 is slopped, the exhaust gas purification solution 15 remaining in the solution supply line 22 can be reliably returned to the storage tank 17. That is, when the internal combustion engine 10 is stopped, the exhaust gas purification solution 15 is not discharged into the exhaust passage 13. Therefore, the exhaust pipe 12 can be prevented from corroding. Further, an unfavorable odor is prevented from being emitted via the exhaust pipe 12. In addition, waste of the exhaust gas purification solution 15 can be reduce or prevented.

Further, when the internal combustion engine 10 is operated, each of the first and second flow path switching valves 55 and 57 of the flow path switching device 53 is positioned at the first switching position by the ECU 28, so that the flow path switching device 53 is switched to the normal flow mode (FIG. 8). Conversely, when the internal combustion engine 10 is stopped, each of the first and second flow path switching valves 55 and 57 of the flow path switching device 53 is positioned at the second switching position by the ECU 28, so that the flow path switching device 53 is switched to the reverse flow mode (FIG. 9). Therefore, the flow path switching device 53 can be structurally simplified.

Further, in the exhaust gas purification device 14, when the internal combustion engine 10 is stepped, the air in the storage tank 17 is used in order to purge the exhaust gas purification solution 15 in the solution supply line 22. That is, ambient air is not used in order to purge the exhaust gas purification solution 15 in the solution supply line 22. Thus, the exhaust gas purification device 14 is formed as a closed circulatory system. Therefore, an unfavorable odor is prevented from being emitted from the exhaust gas purification device 14.

Further, in the exhaust gas purification device 14, it is possible to use a one-way pump as the supply pump 20. That is, it is not necessary to use a complicated reversible pump as the supply pump 20. This may lead to a reduced manufacturing cost of the exhaust gas purification device 14.

Further, when the internal combustion engine 10 is stopped, the air in the storage tank 17 is introduced into the portion of the solution supply line 22 positioned below the flow path switching valve 57 via the air introduction line 50 (FIG. 9). That is, the exhaust gas in the exhaust passage 13 is not introduced into the solution supply line 22. Therefore, the solution supply line 22 can be effectively prevented from corroding.

Further, when the pressure in the portion of the solution supply line 22 positioned below the supply pump 20 exceeds the predetermined value, the pressure can be purged into the air introduction line 50 by the relief valve 52. Thus, the pressure in the portion of the solution supply line 22 positioned below the supply pump 20 can be stabilized.

The exhaust gas purification device 14 of the internal combustion engine 10 according to the second embodiment (FIGS. 8 and 9) of the present invention can be suitably modified. Some modified forms of the first embodiment will now described with reference to FIGS. 10 to 12.

Because the modified forms relate to the first and second embodiments, only the constructions and elements that are different from the first and second embodiments will be explained in detail. Elements that are the same in the first and second embodiments will be identified by the same reference numerals and a detailed description of such elements may be omitted.

Figure 10:
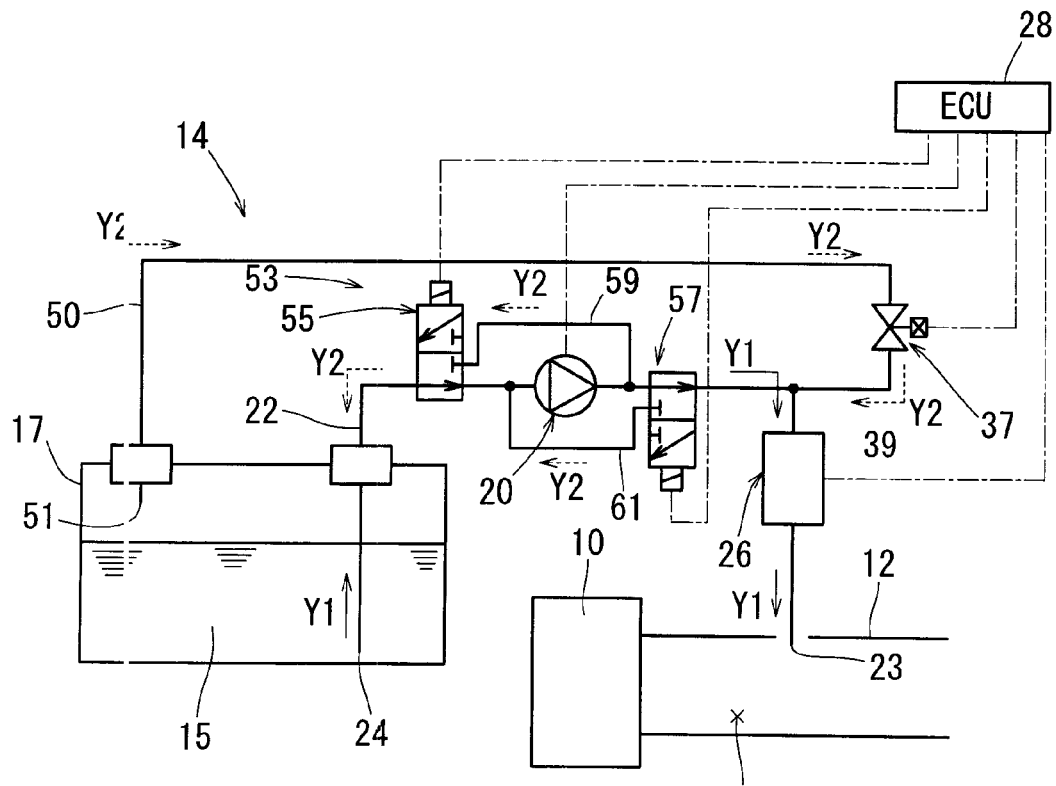
FIG. 10 is a schematic diagram of a first modified form of the second embodiment, which corresponds to a condition in which the internal combustion engine is stopped.
Figure 11:
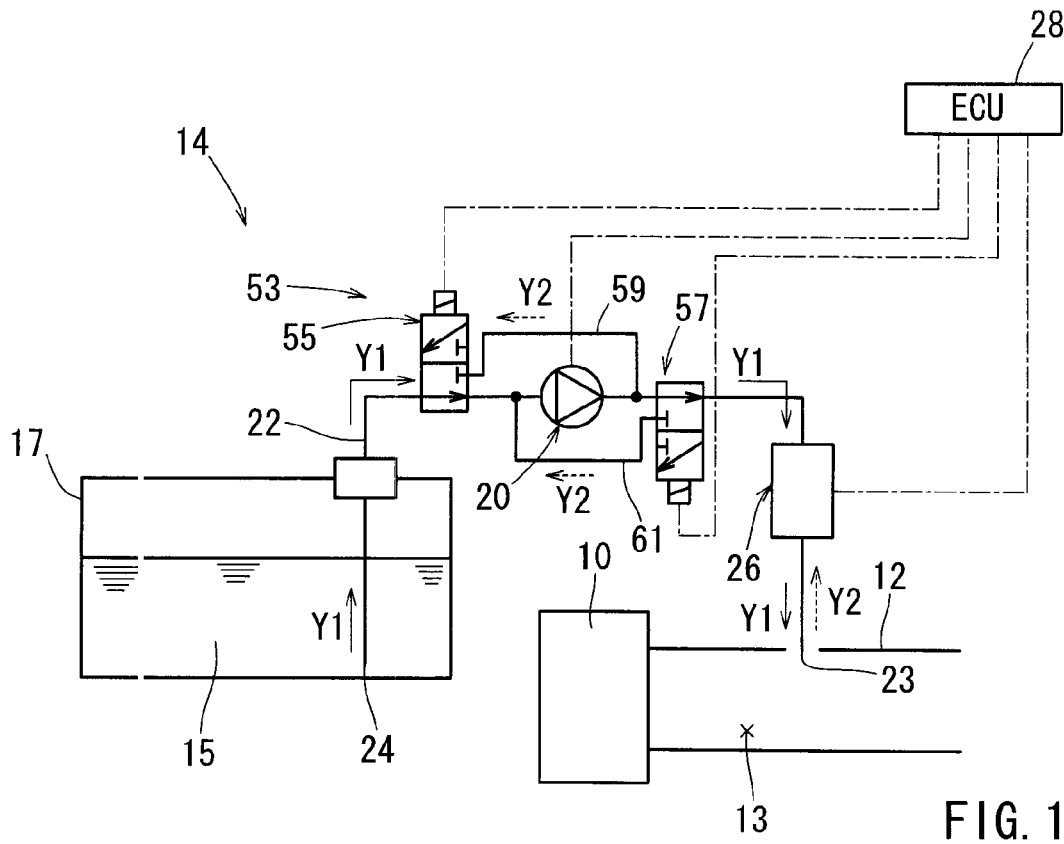
FIG. 11 is a schematic diagram showing a second modified form of the second embodiment, which corresponds to a condition in which the internal combustion engine is stopped.
Figure 12:
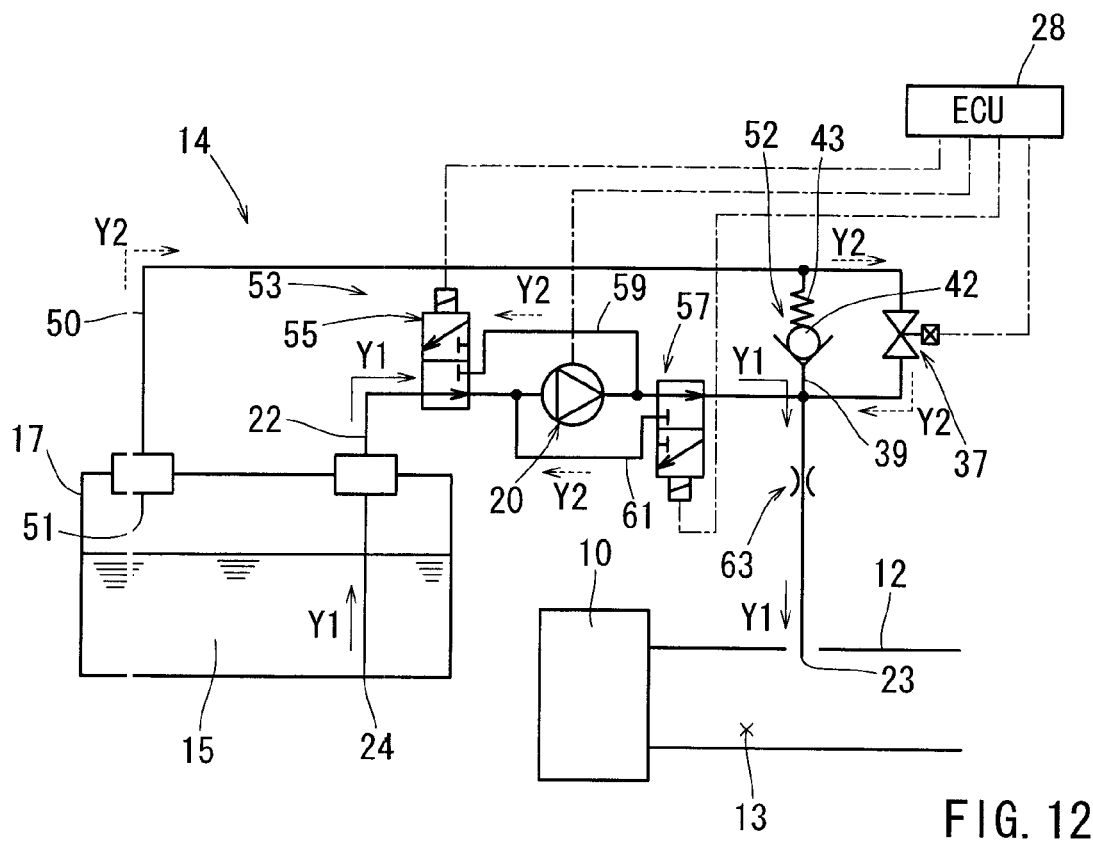
FIG. 12 is a schematic diagram showing a third modified form of the second embodiment, which corresponds to a condition in which the internal combustion engine is stopped.

Further, in each of FIGS. 10 to 12, a flow of the exhaust gas purification solution 15, when the internal combustion engine 10 is operated, is shown by arrows Y1. Conversely, a flow of the exhaust gas purification solution 15 and the air, when the internal combustion engine 10 is stopped, is shown by arrows Y2.

First Modified Form of Second Embodiment

As shown in FIG. 10, in a first modified form of the second embodiment, the bypass line 39 and the relief valve 52 are omitted.

Second Modified Form of Second Embodiment

As shown in FIG. 11, in a second modified form of the second embodiment, the air introduction line 50, the on-off valve 37 and the bypass line 39 including the relief valve 52 are omitted. In this modified form, when the internal combustion engine 10 is stopped, the ECU 28 opens the flow rate control valve 26, so that the exhaust gas in the exhaust passage 13 is introduced into the solution supply line 22. As a result, the exhaust gas purification solution 15 remaining in the solution supply line 22 is returned into the storage tank 17.

Third Modified Form of Second Embodiment

As shown in FIG. 12, in a third modified form of the second embodiment, the flow rate control valve 26 is replaced with a squeezed portion 63 that is formed in the solution supply line 22. As will be recognized, the squeezed portion 45 does not have a variable flow control function or an opening and closing function. Therefore, in this modified form, when the internal combustion engine 10 is stopped, the air in the storage tank 17 is introduced into the portion of the solution supply line 22 positioned below the flow path switching valve 57 via the air introduction line 50. At the same time, the exhaust gas in the exhaust passage 13 is also introduced into the solution supply line 22 via the squeezed portion 63. As a result, the exhaust gas purification solution 15 remaining in the solution supply line 22 is returned into the storage tank 17 via the first and second branch lines 59. Further, the squeezed portion 63 can be replaced with a nozzle (not shown) that is attached to the solution injection orifice 23 of the solution supply line 22, so that the predetermined amount of the solution 15 can be injected into the exhaust passage 13 via the nozzle.

Naturally, various changes and modifications may be made to the second embodiment and the modified forms. For example, an injection nozzle (not shown) can be attached to the solution injection orifice 23 of the solution supply line 22 such that the exhaust gas purification solution 15 can be reliably injected. Further, the flow rate control valve 26 can be replaced with a valve device, e.g., a gate valve and a stop valve, that does not have a variable flow control function. Also, the on-off valve 37 can be replaced with a valve device, e.g., a gate valve and a stop valve. In addition, the first on-off valve 33 as the gas-liquid selection device can be replaced with a flow path switching valve (not shown).

Further, the exhaust gas purification device of the present invention can be used in internal combustion engines of ships, firm machines or other such machines as well as a vehicle. In addition, the exhaust gas purification solution 15 is not limited to the aqueous solution of urea. That is, the exhaust gas purification solution 15 may include various types of liquid reducing agents.

Representative examples of the present invention have been described in detail with reference to the attached drawings. This detailed description is merely intended to teach a person of skill in the art further details for practicing preferred aspects of the present invention and in not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. An exhaust gas purification device of an internal combustion engine, comprising:

a storage tank storing an exhaust gas purification solution that is injected into an exhaust passage of the internal combustion engine;

a solution supply line that is constructed to introduce the exhaust gas purification solution from the storage tank to the exhaust passage;

a supply pump disposed on the solution supply line; and a gas-liquid selection device, wherein the gas-liquid selection device is constructed to selectively introduce the exhaust gas purification solution and air into the solution supply line, wherein the exhaust gas purification solution is injected from the solution supply line into the exhaust passage when the internal combustion engine is operated, thereby purifying an exhaust gas in the exhaust passage, and wherein air in the storage tank is fed into the solution supply line when the internal combustion engine is stopped, thereby evacuating the solution supply line.

2. The exhaust gas purification device of an internal combustion engine as defined in claim 1, further comprising a return line that extends from the storage tank and is communicated with a portion of the solution supply line positioned below the supply pump, so that the exhaust gas purification solution in the solution supply line is returned into the storage tank.

3. The exhaust gas purification device of an internal combustion engine as defined in claim 2, further comprising a relief valve that is arranged to purge a pressure in the portion of the solution supply line positioned below the supply pump into the return line when the pressure exceeds a predetermined value.

4. The exhaust gas purification device of an internal combustion engine as defined in claim 2, further comprising an on-off valve disposed on the return line, wherein the on-off valve is constructed to be closed when the internal combustion engine is operated and to be opened when fie internal combustion engine is stopped.

5. The exhaust gas purification device of an internal combustion engine as defined in claim 3, further comprising an on-off valve disposed on the return line, wherein the on-off valve is constructed to be closed when the internal combustion engine is operated and to be opened when the internal combustion engine is stopped.

6. An exhaust gas purification device of an internal combustion engine, comprising:

a storage tank storing an exhaust gas purification solution that is injected into an exhaust passage of the internal combustion engine;

a solution supply line that is constructed to introduce the exhaust gas purification solution from the storage tank to the exhaust passage;

a supply pump disposed on the solution supply line; and a flow path switching device disposed on the solution supply line, wherein the flow path switching device is constructed and arranged for selectively switching between a normal flow mode in which the exhaust gas purification solution in the storage tank flows through the solution supply line toward the exhaust passage and a reverse flow mode in which the exhaust gas purification solution in the solution supply line is reversely flow through the solution supply line toward the storage tank, wherein the flow path switching device is switched into the normal flow mode when the internal combustion engine is operated, such that the exhaust gas purification solution is injected from the solution supply line into the exhaust passage, thereby purifying an exhaust gas in the exhaust passage, and wherein the flow path switching device is switched into the reverse flow mode when the internal combustion engine is stopped, so that air in the storage tank is fed into the solution supply line, thereby evacuating the solution supply line.

7. The exhaust gas purification device of an internal combustion engine as defined in claim 6, wherein the flow path switching device comprises a first flow path switching valve that is positioned at a portion of the solution supply line positioned above the supply pump and a second flow path switching valve that is positioned at a portion of the solution supply line positioned below the supply pump, wherein the first flow path switching valve is switchable between a first switching position in which the exhaust gas purification solution in the storage tank is introduced into the supply pump and a second switching position in which the exhaust gas purification solution discharged from the supply pump reversely flows toward the storage tank via an branch line that is branched from the portion of the solution supply line positioned below the supply pump, and wherein the second flow path switching valve is switchable between a first switching position in which the exhaust gas purification solution discharged from the supply pump is injected into the exhaust passage and a second switching position in which the exhaust gas purification solution in a portion of the solution supply line positioned below the second flow path switching valve is introduced into the supply pump via a second branch line that is branded from the portion of the solution supply line positioned above the supply pump.

8. The exhaust gas purification device of an internal combustion engine as defined in claim 6, further comprising an air introduction line that extends from the storage tank and is communicated with a portion of the solution supply line positioned below the supply pump, so that air in the storage tank is introduced into the portion of the solution supply line positioned below the supply pump therethrough.

9. The exhaust gas purification device of an internal combustion engine as defined in claim 7, further comprising an air introduction line that extends from the storage tank and is communicated with the portion of the solution supply line positioned below the supply pump, so that air in the storage tank is introduced into the portion of the solution supply line positioned below the supply pump therethrough.

10. The exhaust gas purification device of an internal combustion engine as defined in claim 8, further comprising a relief valve that is arranged to purge a pressure in the portion of the solution supply line positioned below the supply pump into the air introduction line when the pressure exceeds a predetermined value.

11. The exhaust gas purification device of an internal combustion engine as defined in claim 9, further comprising a relief valve that is arranged to purge a pressure in the portion of the solution supply line positioned below the supply pump into the air introduction line when the pressure exceeds a predetermined value.

* * * * *